United States Patent [19]

Akashi et al.

[11] Patent Number: 5,676,202

[45] Date of Patent: Oct. 14, 1997

[54] HEAT EXCHANGER

[75] Inventors: Koji Akashi; Naoki Hiro, both of Osaka; Kenji Nasako, Hirakata; Teruhiko Imoto, Kadoma; Koichi Nishimura, Suita; Ikuo Yonezu, Hirakata, all of Japan

[73] Assignee: Sanyo Electric Co., Ltd., Moriguchi, Japan

[21] Appl. No.: 547,118

[22] Filed: Oct. 23, 1995

[30] Foreign Application Priority Data

Dec. 22, 1994 [JP] Japan ................... 6-320384
May 26, 1995 [JP] Japan ................... 7-152335
Aug. 28, 1995 [JP] Japan ................... 7-218612

[51] Int. Cl.$^6$ ................... F28D 15/00
[52] U.S. Cl. ................... 165/104.12; 62/477; 62/478; 62/481; 62/490
[58] Field of Search ................... 165/104.12; 62/490, 62/489, 481, 480, 478, 477

[56] References Cited

U.S. PATENT DOCUMENTS

| | | | |
|---|---|---|---|
| 4,589,479 | 5/1986 | Gamo et al. | 62/480 X |
| 5,279,359 | 1/1994 | Erickson | 62/480 X |
| 5,347,830 | 9/1994 | Yamada | 62/481 |

FOREIGN PATENT DOCUMENTS

| | | | |
|---|---|---|---|
| 0063513 | 4/1983 | Japan | 62/480 |
| 1-21432 | 2/1989 | Japan | |
| 3-99170 | 4/1991 | Japan | |
| 5280832 | 10/1993 | Japan | 62/477 |

*Primary Examiner*—John Rivell
*Assistant Examiner*—Christopher Atkinson
*Attorney, Agent, or Firm*—Armstrong, Westerman, Hattori, McLeland & Naughton

[57] ABSTRACT

In a heat exchanger according to the present invention, there are provided a filling container having a first containing section containing a hydrogen-absorbing metal material for middle or high temperature, a second containing section containing a hydrogen-absorbing metal material for low temperature which is higher in equilibrium hydrogen pressure at the same temperature than the hydrogen-absorbing metal material for middle or high temperature, and a hydrogen passage for moving hydrogen between the first containing section and the second containing section; a guiding section having a heating section provided with heating means for heating the filling container, a heat radiating section provided with a heat exchanging section for radiating heat generated in the filling container outward, and a heat absorbing section provided with a heat exchanging section for cooling the outside by absorption of heat in the filling container; and moving means for moving the filling container back and forth in the guiding section, moving the first containing section back and forth between the heat radiating section and the heating section, and moving the second containing section back and forth between the heat absorbing section and the heat radiating section.

13 Claims, 13 Drawing Sheets

HEAT EXCHANGER

BACKGROUND OF THE INVENTION

1. Field of the Invention

The present invention relates to a heat exchanger for exchanging heat utilizing exothermic reaction in a case where a hydrogen-absorbing metal material is changed into a metal hydride by absorbing hydrogen and endothermic reaction in a case where a metal hydride is returned to a hydrogen-absorbing metal material by discharging hydrogen.

2. Background of the Invention

In recent years, the destruction of an ozone layer by freon gas, for example, has become a problem. The use of a compressor type heat exchanger using freon gas or the like has been gradually regulated from the position of global environmental protection. Therefore, in recent years heat exchangers of different types from that of the above-mentioned heat exchanger have been developed.

As one of such heat exchangers, a heat exchanger so adapted as to exchange heat utilizing exothermic reaction in a case where a hydrogen-absorbing metal material is changed into a metal hydride by absorbing hydrogen and endothermic reaction in a case where a metal hydride is returned to a hydrogen-absorbing metal material by discharging hydrogen.

In order to sufficiently exchange heat in the heat exchanger, various studies have been also conducted on a hydrogen-absorbing metal material used therefor.

Preferable as a hydrogen-absorbing metal material utilized for heat exchange is a material having the following features: suitable equilibrium hydrogen pressure depending on the temperature level used, a small slope of a plateau area and hysteresis and superior reversibility, a large effective hydrogen stored amount, a large rate of reaction, and a long life of hydrogen absorption and discharge cycle. As a hydrogen-absorbing metal material having such features, a hydrogen-absorbing alloy including a rare earth element has been developed. Further, a hydrogen-absorbing alloy for middle or high temperature and a hydrogen-absorbing alloy for low temperature which is higher in equilibrium hydrogen pressure at the same temperature than the hydrogen-absorbing alloy for middle or high temperature have been developed.

Examples of the heat exchanger using the above-mentioned hydrogen-absorbing metal material include one disclosed in Japanese Patent Publication No. 19955/1983, for example.

The heat exchanger disclosed in this gazette is illustrated in FIG. 1. Two types of hydrogen-absorbing metal materials for middle or high temperature and low temperature M1 and M2 which differ in equilibrium hydrogen pressure are used. The hydrogen-absorbing metal materials M1 and M2 are respectively contained in different filling containers 1. In addition, a hydrogen guide tube 2 is provided between the filling containers 1. Hydrogen is supplied to either one of the filling containers 1, so that the hydrogen-absorbing metal material M1 or M2 is brought into a metal hydride M1H or M2H by absorbing hydrogen. Further, a lot of heat exchange fins 3 are provided around each of the filling containers 1 in order to efficiently exchange heat in the filling container 1.

In exchanging heat by the heat exchanger, each of the filling containers 1 is heated or cooled, to move hydrogen between the filling containers 1 through the hydrogen guide tube 2, so that the filling container 1 is cooled by endothermic reaction in a case where the metal hydride M1H or M2H which has absorbed hydrogen is returned to the hydrogen-absorbing metal material M1 or M2 by discharging hydrogen, while the filling container 1 is heated by exothermic reaction in a case where the hydrogen-absorbing metal material M1 or M2 is changed into the metal hydride M1H or M2H by absorbing hydrogen, and heat is exchanged through the heat exchange fins 3 provided around each of the filling containers 1.

In addition to the above-mentioned heat exchanger, there exists a heat exchanger so adapted that heat-exchange fins 3 as well as a medium passing tube 4 through which a heat exchange medium flows are provided in a filling container 1 containing a hydrogen-absorbing metal material M1 or M2, the heat exchange medium flowing through the medium passing tube 4 is cooled through the heat exchange fins 3 by endothermic reaction in a case where a metal hydride M1H or M2H which has absorbed hydrogen is changed into a hydrogen-absorbing metal material M1 or M2 by discharging hydrogen, while being heated through the heat exchange fins 3 by exothermic reaction in a case where a hydrogen-absorbing metal material M1 or M2 is changed into a metal hydride M1H or M2H by absorbing hydrogen, and heat is exchanged by the heat exchange medium thus cooled or heated.

In each of the above-mentioned heat exchangers, the heat exchange fins are cooled by endothermic reaction in a case where the metal hydride M1H or M2H is changed into the hydrogen-absorbing metal material M1 or M2 by discharging hydrogen, while being heated by exothermic reaction in a case where the hydrogen-absorbing metal material M1 or M2 is changed into the metal hydride M1H or M2H by absorbing hydrogen. Therefore, heat energy in the heat exchange fins cooled or heated is lost, that is, so-called sensible heat loss is increased every time endothermic reaction and exothermic reaction are switched in each of the filling containers, resulting in decreased heat exchanger effectiveness in the heat exchanger.

Furthermore, in each of the above-mentioned heat exchangers, the hydrogen-absorbing metal material M1 or M2 expands upon absorbing hydrogen, while the metal hydride M1H or M2H which has thus absorbed hydrogen contracts upon discharging hydrogen. If heat exchange is performed in the above-mentioned manner repeatedly many times, therefore, the hydrogen-absorbing metal material M1 or M2 is gradually finely powdered. The hydrogen-absorbing metal material M1 or M2 finely powdered is gradually accumulated at the bottom of the filling container, whereby the density of the hydrogen-absorbing metal material M1 or M2 at the bottom of the filling container is gradually increased.

The hydrogen-absorbing metal material M1 or M2 is changed into the metal hydride M1H or M2H by absorbing hydrogen in a state where the density of the hydrogen-absorbing metal material M1 or M2 at the bottom of the filling container is thus increased. When the hydrogen-absorbing metal material expands, the bottom of the filling container is gradually deformed. In extreme cases the filling container is destroyed.

Furthermore, in each of the heat exchangers, two types of hydrogen-absorbing metal materials for middle or high temperature and low temperature M1 and M2 are respectively contained in different filling containers, and the filling containers are respectively heated or cooled at suitable timings to move hydrogen between the filling containers. Therefore, control for heating or cooling each of the filling containers is troublesome. Further, the heat exchanger is increased in size, and the running cost thereof is high.

SUMMARY OF THE INVENTION

A first object of the present invention is to provide a heat exchanger for exchanging heat utilizing exothermic reaction in a case where a hydrogen-absorbing metal material is changed into a metal hydride by absorbing hydrogen and endothermic reaction in a case where a metal hydride is returned to a hydrogen-absorbing metal material by discharging hydrogen, wherein heat exchange which hardly suffers sensible heat loss and is efficient is performed without losing a lot of heat energy in heat exchange fins or the like when the exothermic reaction and the endothermic reaction are switched.

Another object of the present invention is to provide a heat exchanger which can simply perform an operation for heating or cooling a filling container containing a hydrogen-absorbing metal material, can be miniaturized, and can be reduced in the running cost.

Still another object of the present invention is to provide a heat exchanger capable of exchanging heat stably for a long time period without deforming or destroying a filling container by expansion of a hydrogen-absorbing metal material even when heat is exchanged by repeatedly absorbing and discharging hydrogen in the hydrogen-absorbing metal material.

In a heat exchanger according to the present invention, there are provided a filling container having a first containing section containing a hydrogen-absorbing metal material for middle or high temperature, a second containing section containing a hydrogen-absorbing metal material for low temperature which is higher in equilibrium hydrogen pressure at the same temperature than the hydrogen-absorbing metal material for middle or high temperature, and a hydrogen passage for moving hydrogen between the first containing section and the second containing section; a guiding section having a heating section provided with heating means for heating the filling container, a heat radiating section provided with a heat exchanging section for radiating heat generated in the filling container outward, and a heat absorbing section provided with a heat exchanging section for cooling the outside by heat absorption in the filling container; and moving means for moving the filling container back and forth in the guiding section, moving the first containing section in the filling container between the heat radiating section and the heating section, and moving the second containing section back and forth between the heat absorbing section and the heat radiating section.

When the filling container is moved along the guiding section by the moving means in a state where the hydrogen-absorbing metal material for middle or high temperature contained in the first containing section in the filling container is brought into a metal hydride by absorbing hydrogen, to introduce the first containing section into the heating section and introduce the second containing section containing the hydrogen-absorbing metal material for low temperature into the heat radiating section, the first containing section is heated in the heating section. Consequently, the metal hydride in the first containing section is returned to the hydrogen-absorbing metal material by discharging hydrogen while absorbing heat, and the discharged hydrogen is supplied to the second containing section from the first containing section 14 via the hydrogen passage. On the other hand, the hydrogen-absorbing metal material for low temperature contained in the second containing section is changed into a metal hydride by absorbing hydrogen while generating heat. The heat is radiated outward from the heat exchanging section in the heat radiating section.

When the filling container is moved along the guiding section by the moving means in the opposite direction to that in the above described case in a state where the hydrogen-absorbing metal material for low temperature contained in the second containing section is brought into the metal hydride by absorbing hydrogen, to introduce the first containing section from the heating section into the heat radiating section and introduce the second containing section from the heat radiating section into the heat absorbing section, the first containing section heated is gradually cooled by radiating heat in the heat radiating section. Consequently, the metal hydride in the second containing section is returned to the hydrogen-absorbing metal material by discharging hydrogen while absorbing heat in the heat absorbing section due to the difference in equilibrium hydrogen pressure between the hydrogen-absorbing metal materials for middle or high temperature and low temperature. The outside is cooled through the heat exchanging section in the heat absorbing section, while the hydrogen thus discharged is supplied to the first containing section from the second containing section via the hydrogen passage. On the other hand, the hydrogen-absorbing metal material for middle or high temperature contained in the first containing section is changed into the metal hydride by absorbing hydrogen while radiating heat. The heat is radiated outward from the heat exchanging section as described above.

In the heat exchanger, the filling container containing two types of hydrogen metal materials for middle or high temperature and low temperature is moved back and forth along the guiding section. Radiation and absorption of heat in each of the hydrogen-absorbing metal materials contained in the filling container are respectively performed in the heat radiating section and the heat absorbing section in the guiding section, and heat is radiated to and absorbed from the outside by the heat exchanging sections provided in the heat radiating section and the heat absorbing section. Therefore, the apparatus can efficiently exchange heat, unlike the conventional heat exchanger in which heat exchange fins are provided in filling containers, and heat in the heat exchange fins or the like is lost every time exothermic reaction and endothermic reaction are switched.

In the heat exchanger according to the present invention, two types of hydrogen-absorbing metal materials for middle or high temperature and low temperature are contained in one filling container, and the filling container is moved back and forth along the guiding section to apply, radiate and absorb heat. Therefore, the apparatus can be smaller in size, can be controlled more easily, and is made lower in running cost, as compared with the conventional heat exchanger in which two types of hydrogen-absorbing metal materials for middle or high temperature and low temperature are respectively contained in different filling containers to heat or cool each of the filling containers at suitable timing.

Furthermore, when the filing container is moved back and forth along the guiding section, each of the hydrogen-absorbing metal materials is agitated in the filling container. Therefore, absorption and discharge of hydrogen in each of the hydrogen-absorbing metal materials are smoothed, whereby radiation and absorption of heat in each of the hydrogen-absorbing metal materials are efficiently performed. In addition, even when each of the hydrogen-absorbing metal materials is finely powdered by absorption and discharge of hydrogen, there is little possibility that the hydrogen-absorbing metal material finely powdered is accumulated at the bottom of the filling container to increase the density thereof. When each of the hydrogen-absorbing metal materials expands by absorbing hydrogen, the bottom of the filling container is hardly deformed.

In the above-mentioned heat exchanger, when a cylindrical filling container is used as the filling container, and the filling container is rotated in its peripheral direction by the rotating means, each of the hydrogen-absorbing metal materials contained in the filling container is agitated more effectively by the rotation. Therefore, radiation and absorption of heat in each of the hydrogen-absorbing metal materials are performed more efficiently. In addition, there is little possibility that each of the hydrogen-absorbing metal materials finely powdered is accumulated at the bottom of the filling container to increase the density thereof. Even when each of the hydrogen-absorbing metal materials expand by absorbing hydrogen, the bottom of the filling container is hardly deformed.

In the above-mentioned heat exchanger, when the filling container is brought into close contact with the guiding section at the time of stopping the filling container, while a space is provided between the filling container and the guiding section at the time of moving the filling container, the filing container is brought into close contact with the heat radiating section and the heat absorbing section in the guiding section at the time of stopping the filling container so that heat is exchanged efficiently by radiation and absorption of heat, while frictional resistance between the filling container and the guiding section is reduced at the time of moving the filling container so that the movement of the filling container in the guiding section is smoothed, eliminating the necessity of using large power for moving the filling container.

Additionally, in the above-mentioned heat exchanger, when there is provide opening or closing means for closing the hydrogen passage for moving hydrogen between the first containing section and the second containing section at the time of moving the filling container by the moving means, while opening the hydrogen passage at the time of stopping the filling container, radiation and absorption of heat in the heat radiating section and the heat absorbing section are efficiently performed without moving hydrogen between the first containing section and the second containing section to absorb and radiate heat in the course of the introduction of the first containing section and the second containing section in the filling container into the heat radiating section and the heat absorbing section in the guiding section.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Heat exchangers according to embodiments of the present invention will be specifically described.

(Embodiment 1)

Figure 1:
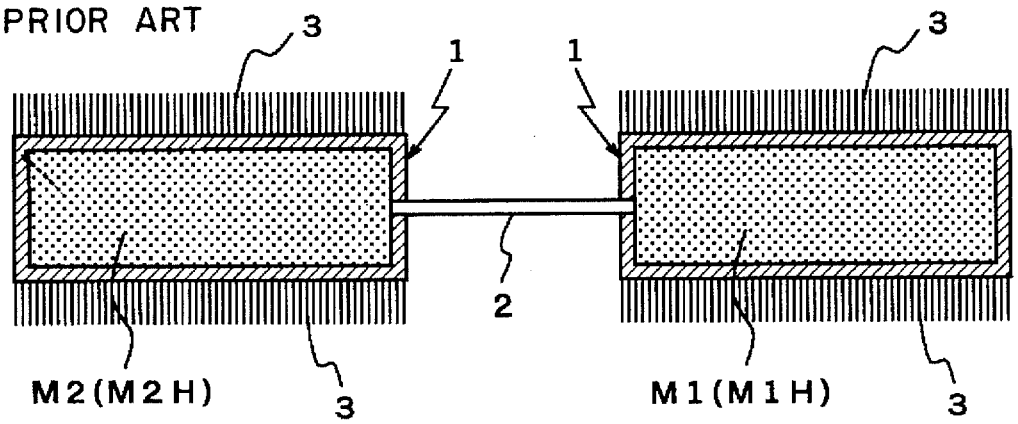
FIG. 1 is a schematic cross-sectional view of a conventional heat exchanger.
Figure 2:
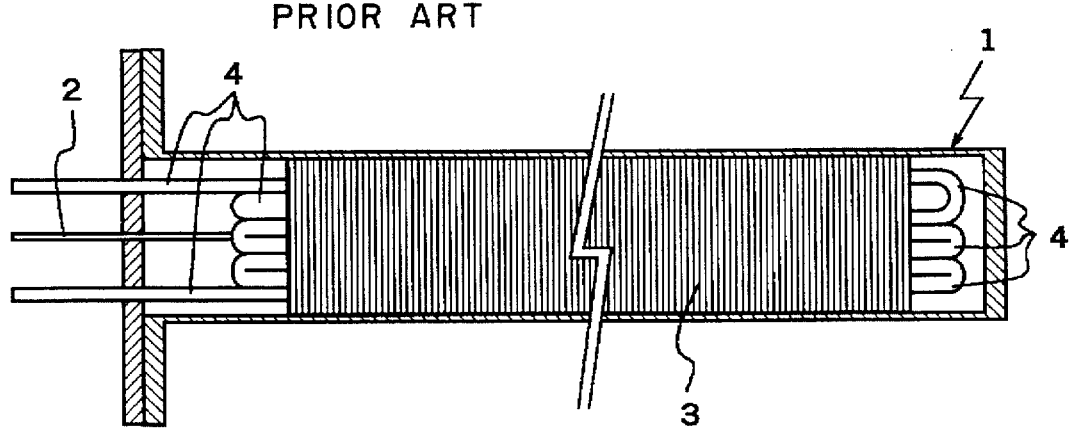
FIG. 2 is a schematic cross-sectional view showing the state of a filling container which is provided with a medium passing tube through which a heat exchange medium passes in the conventional heat exchanger.
Figure 3:
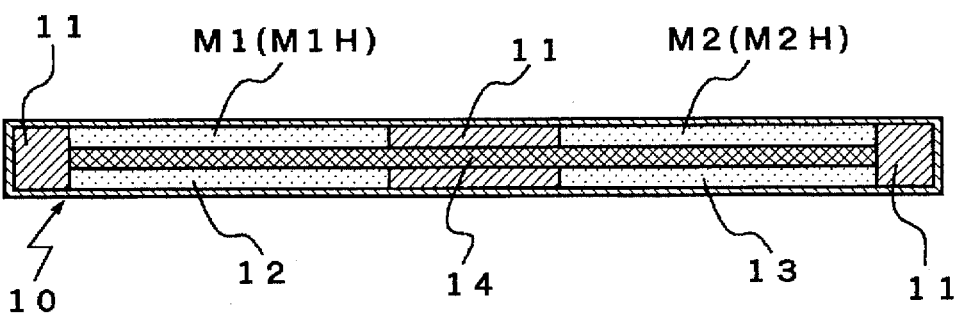
FIG. 3 is a schematic cross-sectional view of a filling container used in a heat exchanger according to an embodiment 1 of the present invention.

A heat exchanger according to the present embodiment is illustrated in FIG. 3. In a filling container 10 made of a metal and in a long narrow hollow shape, heat insulation materials 11 are respectively provided at both ends and the center along the length of the filling container 10. The inside of the filling container 10 is separated into a first containing section 12 and a second containing section 13 by the heat insulation material 11 at the center. A hydrogen passage for moving hydrogen is provided between the first containing section 12 and the second containing section 13. As the hydrogen passage 14, an air-permeable filter tube through which hydrogen passes but the powder of a hydrogen-absorbing metal material does not pass is so provided that the first containing section 12 and the second containing section 13 communicate with each other by penetrating through the heat insulation material 11 at the center.

A hydrogen-absorbing metal material for middle or high temperature M1 is contained in the first containing section 12 in the above-mentioned filling container 10, and a hydrogen-absorbing metal material for low temperature M2 which is higher in equilibrium hydrogen pressure at the same temperature than the hydrogen-absorbing metal material for middle or high temperature M1 is contained in the second containing section 13. In this state, hydrogen is supplied to either one of the first containing section 12 and the second containing section 13, so that the hydrogen-absorbing metal material for middle or high temperature or low temperature M1 or M2 is brought into a metal hydride M1H or M2H by absorbing hydrogen.

Figure 4:
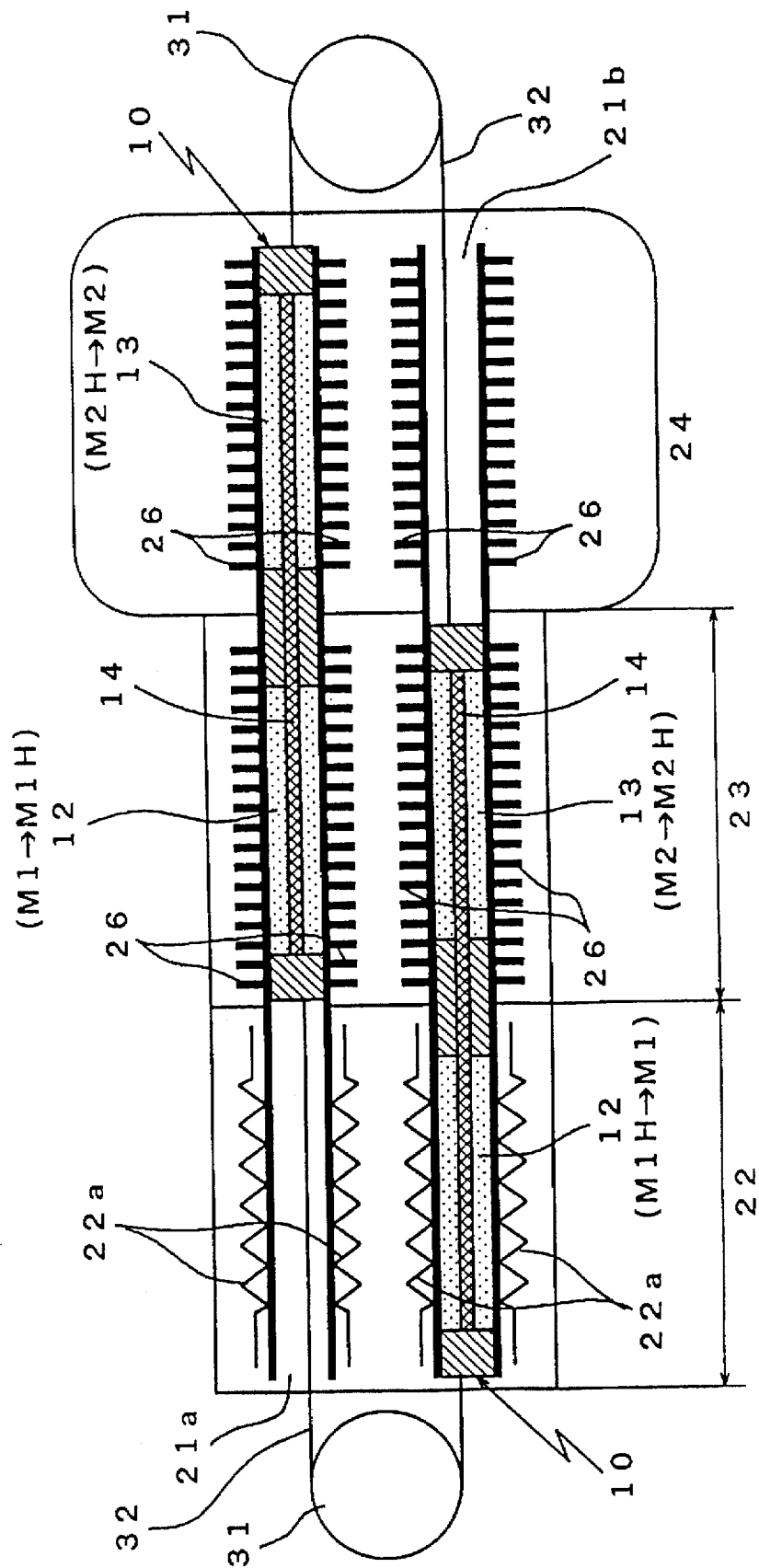
FIG. 4 is a schematic illustration showing a state where the filling container shown in FIG. 3 is contained by shifting the position thereof in a pair of upper and lower guiding sections in the heat exchanger according to the embodiment 1.
Figure 5:
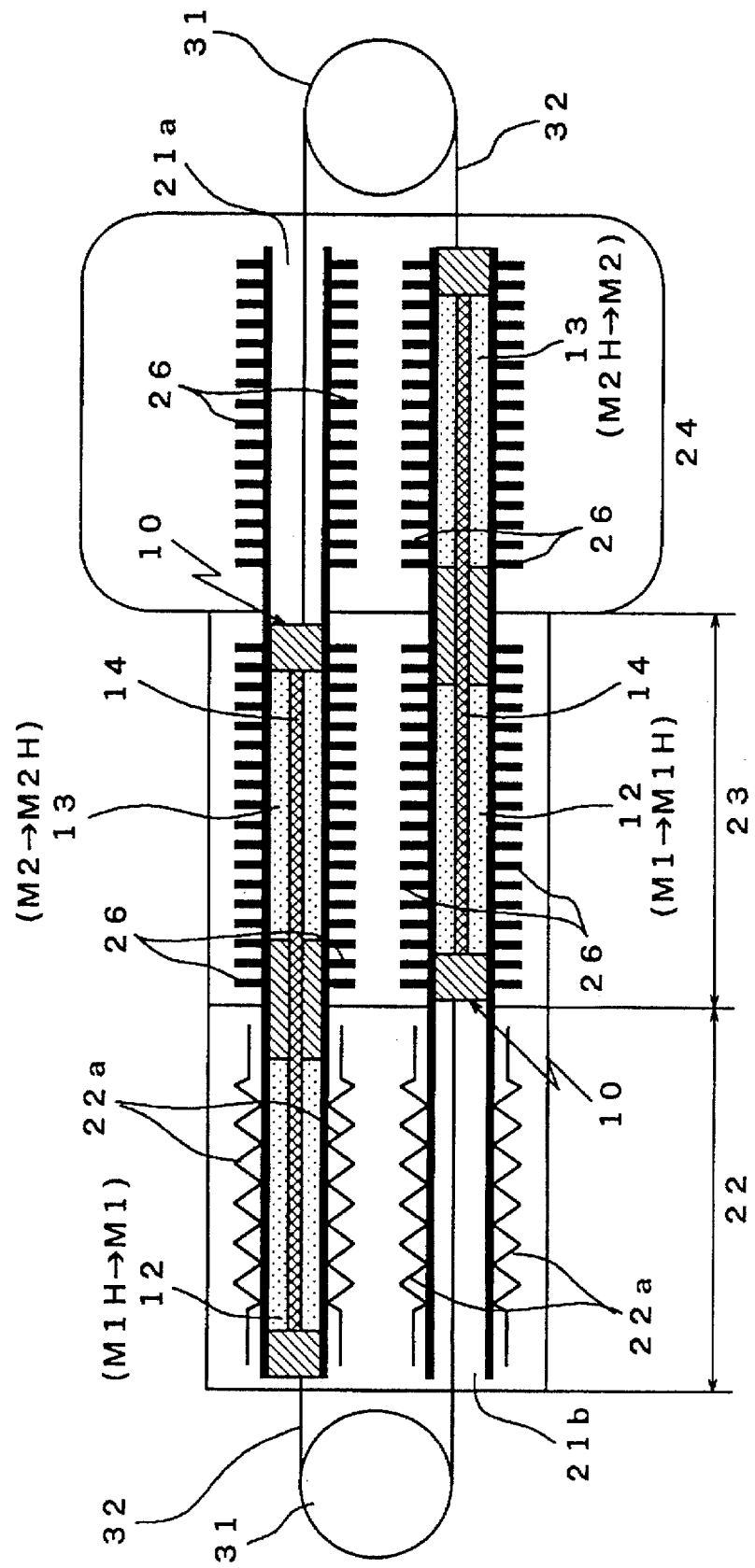
FIG. 5 is a schematic illustration showing a state where filling containers contained in the upper and lower guiding sections are moved to change the positions of the filling containers in the heat exchanger according to the embodiment 1.

The heat exchanger according to the present embodiment is further illustrated in FIGS. 4 and 5. A pair of upper and lower guiding sections 21a and 21b for moving the above-mentioned filling container 10 are provided with required spacing. In addition, a heating section 22 provided with a heater 22a for heating the filling container 10, a heat radiating section 23 for radiating heat generated in the filling container 10 outward, and a heat absorbing section 24 for cooling the outside by absorption of heat in the filling container 10 are provided along each of the guiding sections 21a and 21b. A lot of heat exchange fins 26 are provided as a heat exchanging section in each of the heat radiating section 23 and the heat absorbing section 24 in each of the guiding sections 21a and 21b so that heat is efficiently exchanged.

Filling containers 10 are respectively contained in the guiding sections 21a and 21b so as to be capable of being moved along the guiding sections 21a and 21b.

In respectively containing the filling containers 10 in the guiding sections 21a and 21b, the position of the filling container 10 contained in each of the guiding sections 21a and 21b is shifted. For example, the first containing section 12 and the second containing section 13 in the filling container 10 are respectively positioned in the heat radiating section 23 and the heat absorbing section 24 in the upper guiding section 21a, while the first containing section 12 and the second containing section 13 in the filling container 10 are respectively positioned in the heating section 22 and the heat radiating section 23 in the lower guiding section 21b, as shown in FIG. 4.

Furthermore, in moving the filling containers 10 respectively contained in the guiding sections 21a and 21b back and forth along the guiding sections 21a and 21b, pulleys 31 are respectively disposed so as to stretch over both the guiding sections 21a and 21b on both sides of the guiding sections 21a and 21b, and ends of each of belts 32 wound around the pulleys 31 are respectively attached to ends of the filling containers 10.

The above-mentioned pulleys 31 are rotated by a motor (not shown), to move the filling containers 10 in opposite directions along the respective guiding sections 21a and 21b. In addition, the direction of rotation of the pulleys 31 is switched at suitable timing, to respectively move the filling containers 10 back and forth along the guiding sections 21a and 21b. Therefore, the first containing section 12 containing the hydrogen-absorbing metal material for middle or high temperature M1 in each of the filling containers 10 is moved back and forth between the heat radiating section 23 and the heating section 22 in each of the guiding sections 21a and 21b, and the second containing section 13 containing the hydrogen-absorbing metal material for low temperature M2 is moved back and forth between the heat absorbing section 24 and the heat radiating section 23 in each of the guiding sections 21a and 21b.

A case where heat is exchanged by the heat exchanger according to the present embodiment will be specifically described.

When the pulleys 31 are rotated as described above to move the filling containers 10 in the guiding sections 21a and 21b, to respectively introduce the first containing section 12 and the second containing section 13 in the filling container 10 in the upper guiding section 21a into the heat radiating section 23 and the heat absorbing section 24, while introducing the first containing section 12 and the second containing section 13 in the filling container 10 in the lower guiding section 21b into the heating section 22 and the heat radiating section 23, as shown in FIG. 4, the hydrogen-absorbing metal material for low temperature M2 contained in the second containing section 13 is brought into the metal hydride M2H by absorbing hydrogen in the filing container 10 in the upper guiding section 21a, while the hydrogen-absorbing metal material for middle or high temperature M1 contained in the first containing section 12 is brought into the metal hydride M1H by absorbing hydrogen in the filling container 10 in the lower guiding section 21b.

When the first containing section 12 and the second containing section 13 in the filling container 10 are respectively introduced into the heat radiating section 23 and the heat absorbing section 24 in the upper guiding section 21a as described above, the first containing section 12 heated in the heating section 22 is gradually cooled by radiation of heat in the heat radiating section 23, while the metal hydride M2H in the second containing section 13 introduced into the heat absorbing section 24 is returned to the hydrogen-absorbing metal material M2 by discharging hydrogen while absorbing heat due to the difference in equilibrium hydrogen pressure between the hydrogen-absorbing metal materials M1 and M2, and the outside is cooled through the heat exchange fins 26 provided in the heat absorbing section 24. On the other hand, the hydrogen discharged from the metal hydride M2H is supplied to the first containing section 12 from the second containing section 13 via the hydrogen passage 14, the hydrogen-absorbing metal material for middle or high temperature M1 contained in the first containing section 12 is changed into the metal hydride M1H by absorbing the hydrogen while generating heat, and the heat is radiated outward through the heat exchange fins 26 provided in the heat radiating section 23.

On the other hand, when the first containing section 12 and the second containing section 13 in the filling container 10 are introduced into the heating section 22 and the heat radiating section 23 in the lower guiding section 21b, the first containing section 12 is heated in the heating section 22, whereby the metal hydride M1H in the first containing section 12 is returned to the hydrogen-absorbing metal material M1 by discharging hydrogen while absorbing heat. In addition, the hydrogen thus discharged is supplied to the second containing section 13 from the first containing section 12 via the hydrogen passage 14, the hydrogen-absorbing metal material for low temperature M2 contained in the second containing section 13 is changed into the metal hydride M2H by absorbing the hydrogen while generating heat, and the heat is radiated outward through the heat exchange fins 26 provided in the heat radiating section 23.

After heat is absorbed and radiated, respectively, in the heat absorbing section 24 and the heat radiating section 23 in the upper guiding section 21a, while heat is radiated in the heat radiating section 23 in the lower guiding section 21b, as described above, the pulleys 31 are rotated in the opposite direction to that in the above-mentioned case to respectively move the filling containers 10 in opposite directions, to introduce the first containing section 12 and the second containing section 13 in the filling container 10 in the upper guiding section 21a into the heating section 22 and the heat radiating section 23, while introducing the first containing section 12 and the second containing section 13 in the filling container 10 in the lower guiding section 21b into the heat radiating section 23 and the heat absorbing section 24, as shown in FIG. 5.

Consequently, the filling container 10 in the upper guiding section 21a and the filling container 10 in the lower guiding section 21b are opposite to those in the above-mentioned case. Specifically, in the filling container 10 in the upper guiding section 21a, hydrogen is discharged from the metal hydride M1H contained in the first containing section 12 positioned in the heating section 22, and the hydrogen is absorbed by the hydrogen-absorbing metal material for low temperature M2 contained in the second containing section 13 positioned in the heat radiating section 23, whereby heat is radiated in the heat radiating section 23 by exothermic reaction in the second containing section 13. On the other hand, in the filling container 10 in the lower guiding section 21b, hydrogen is discharged from the metal hydride M2H contained in the second containing section 13 positioned in the heat absorbing section 24, and the hydrogen is absorbed by the hydrogen-absorbing metal material for middle or high temperature M1 contained in the first containing section 12 positioned in the heat radiating section 23, whereby heat is absorbed in the heat absorbing section 24 by endothermic reaction in the second containing section 13 and heat is radiated in the heat radiating section 23 by exothermic reaction in the first containing section 12.

When the filling containers 10 are respectively moved back and forth along the guiding sections 21a and 21b so that radiation and absorption of heat in each of the hydrogen-absorbing metal materials M1 and M2 contained in each of the filling containers 10 are performed in the heat radiating section 23 and the heat absorbing section 24, respectively, as described above, radiation and absorption of heat are always performed in the heat radiating section 23 and the heat absorbing section 24, respectively, even when the exothermic reaction and the endothermic reaction are switched in each of the hydrogen-absorbing metal materials M1 and M2. Therefore, heat is not lost in the heat exchange fins 26 provided in the heat radiating section 23 and the heat absorbing section 24, whereby heat is efficiently exchanged.

Furthermore, when each of the filling containers 10 is moved back and forth as described above, the hydrogen-absorbing metal materials M1 and M2 contained in the respective containing sections 12 and 13 in the filling container 10 are agitated. Therefore, absorption and discharge of hydrogen in each of the hydrogen-absorbing metal materials M1 and M2 are smoothed, whereby generation and absorption of heat therein can be efficiently performed. In a case where each of the hydrogen-absorbing metal materials M1 and M2 is agitated in the filling container 10, even when each of the hydrogen-absorbing metal materials M1 and M2 is finely powdered by absorption and discharge of hydrogen, there is little possibility that the hydrogen-absorbing metal material finely powdered is accumulated at the bottom of the filling container 10 to increase the density thereof. Even if each of the hydrogen-absorbing metal materials M1 and M2 expands by absorbing hydrogen, the bottom of the filling container 10 is hardly deformed.

Furthermore, in the heat exchanger, the filling containers 10 are so moved in the pair of upper and lower guiding sections 21a and 21b that the positions of the containing sections 12 and 13 in each of the filling containers 10 are switched among the heating section 22, the heat radiating section 23 and the heat absorbing section 24 as described above, to always radiate and absorb heat in the heat radiating section 23 and the heat absorbing section 24. Therefore, it is possible to continuously exchange heat by radiation and absorption of heat.

Figure 6:
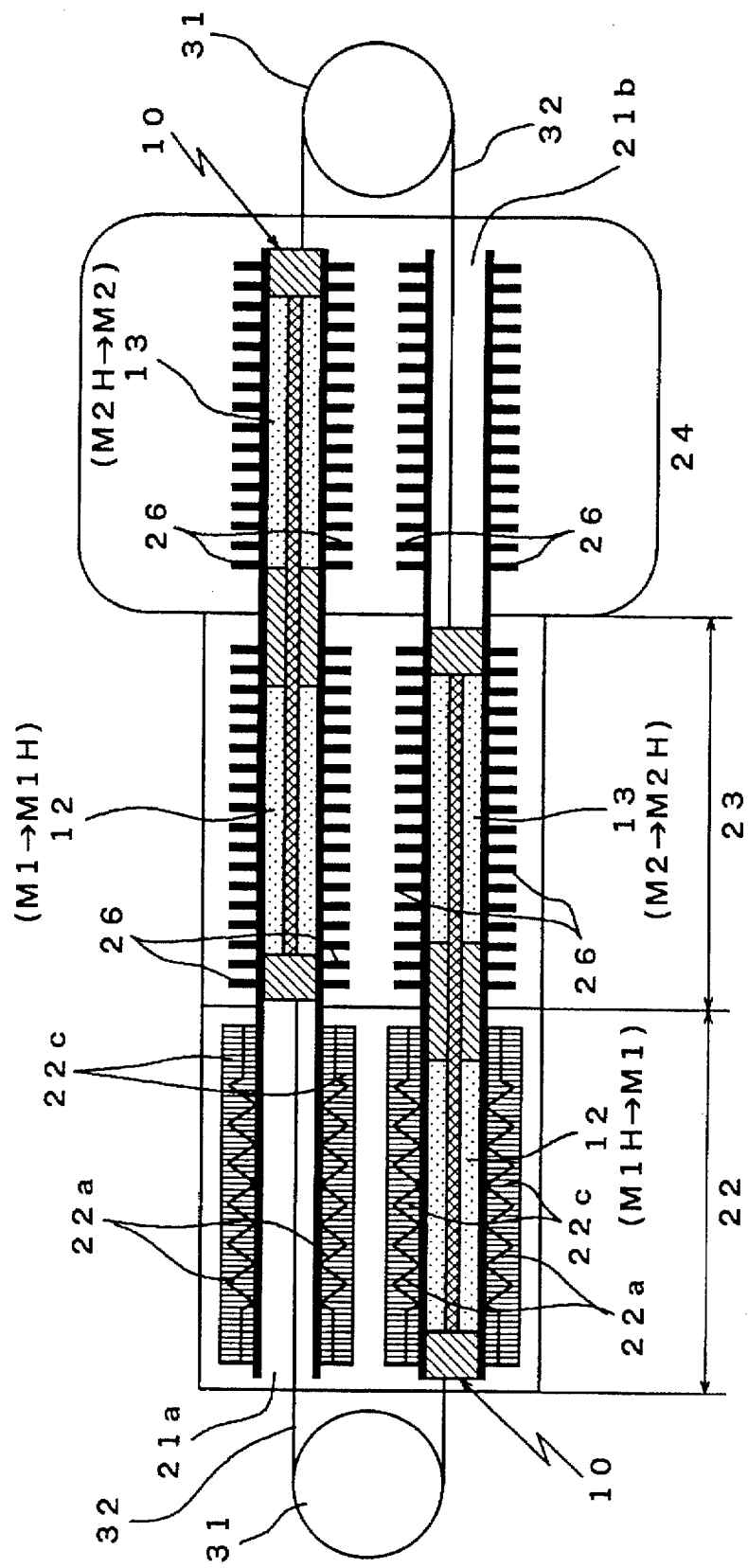
FIG. 6 is a schematic illustration showing a state where each of heating sections in the upper and lower guiding sections is provided with a heat transferring section using a material having good thermal conductivity in the heat exchanger according to the embodiment 1.
Figure 7:
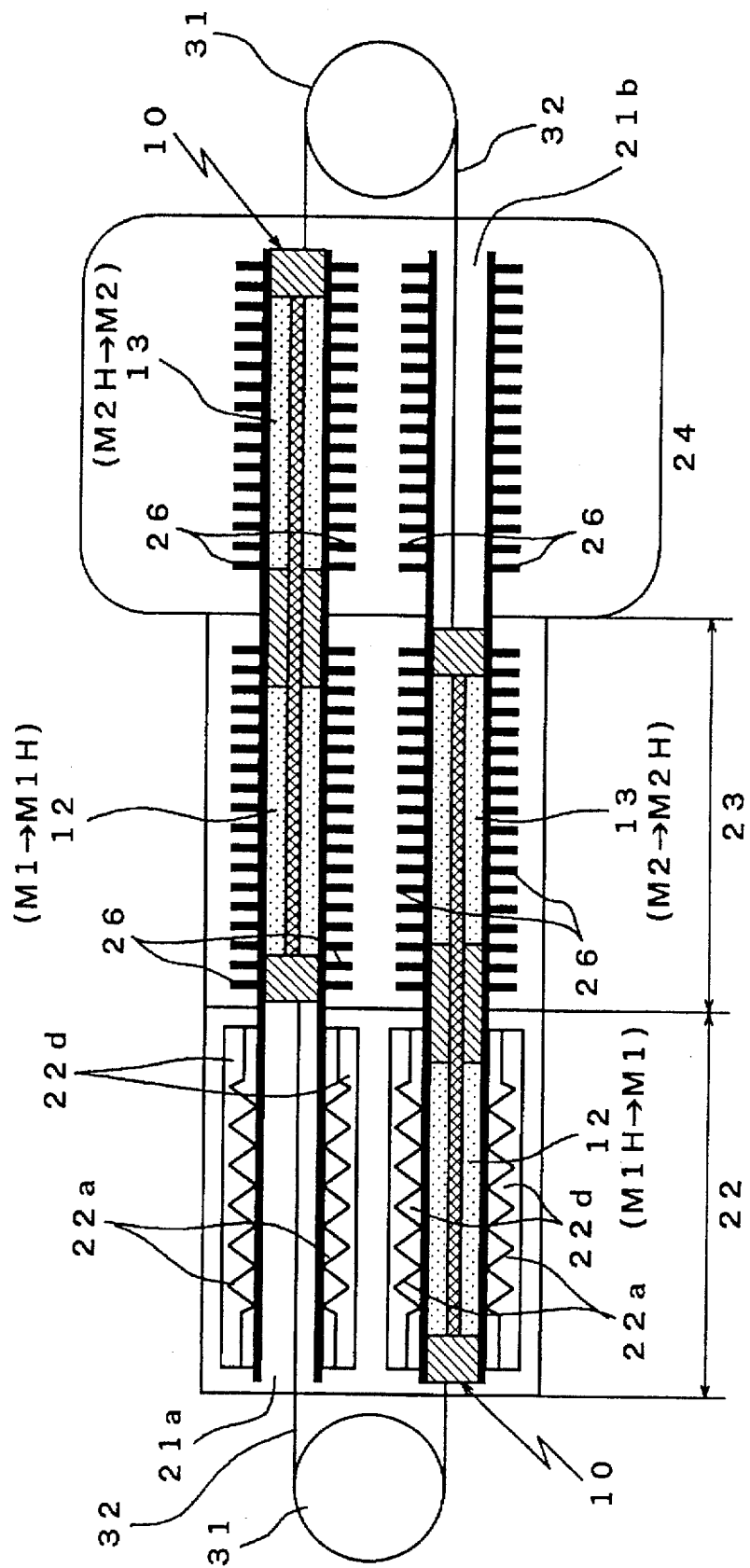
FIG. 7 is a schematic illustration showing a state where each of heating sections in the upper and lower guiding sections is provided with a heat accumulating section for accumulating heat generated by a heater in the heat exchanger according to the embodiment 1.

In heating each of the filling containers 10 in each of the heating sections 22 in the guiding sections 21a and 21b in the above-mentioned heat exchanger, it is preferable that a heat transferring section 22c made of a material superior in thermal conductivity, for example, heat transfer cement is provided in the vicinity of a heater 22a in the heating section 22 as shown in FIG. 6, to efficiently transfer heat generated by the heater 22a to the filling container 10. Further, a heat accumulating section 22 for accumulating heat generated by the heater 22a in the heating section 22 is provided in the vicinity of the heater 22a as shown in FIG. 7, and excess heat is accumulated in the heat accumulating section 22d, to efficiently utilize the heat generated by the heater 22a.

Furthermore, in moving each of the filling containers 10 back and forth in each of the guiding sections 21a and 21b in the above-mentioned heat exchanger, when each of the filling containers 10 is moved in a state where it is brought into close contact with each of the guiding sections 21a and 21b, frictional resistance at the time of the movement of the filling container 10 is increased. Therefore, it is preferable that each of the filling containers 10 is brought into close contact with each of the guiding sections 21a and 21b to increase heat exchanger effectiveness at the time of stopping the filling container 10, while a space is provided between each of the filling containers 10 and each of the guiding sections 21a and 21b to smooth the movement of the filling container 10 at the time of moving the filling container 10.

Figure 8:
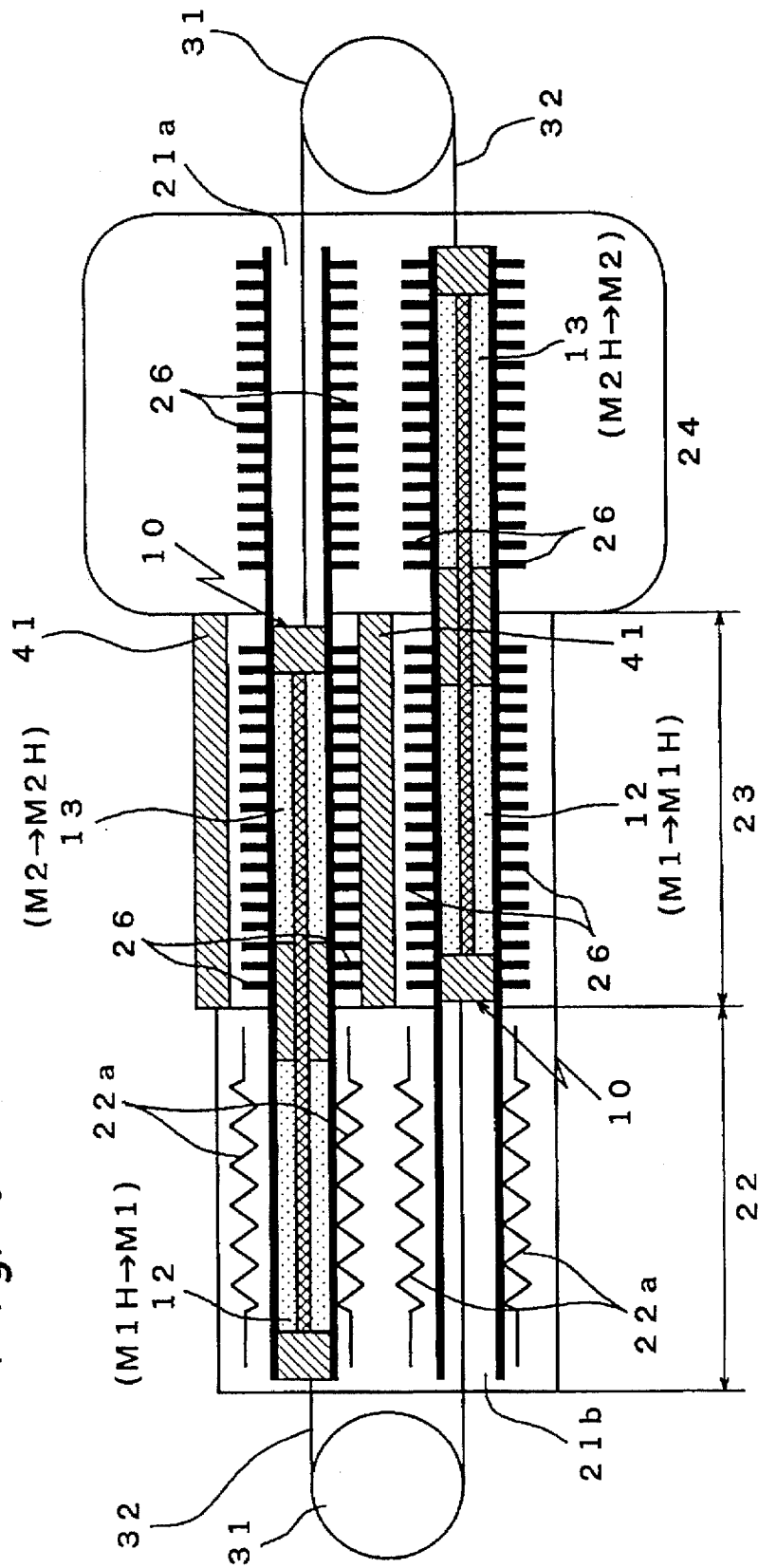
FIG. 8 is a schematic illustration showing a state where each of filling containers is brought into close contact with each of guiding sections provided separably in the longitudinal direction to exchange heat in the heat exchanger according to the embodiment 1.
Figure 9:
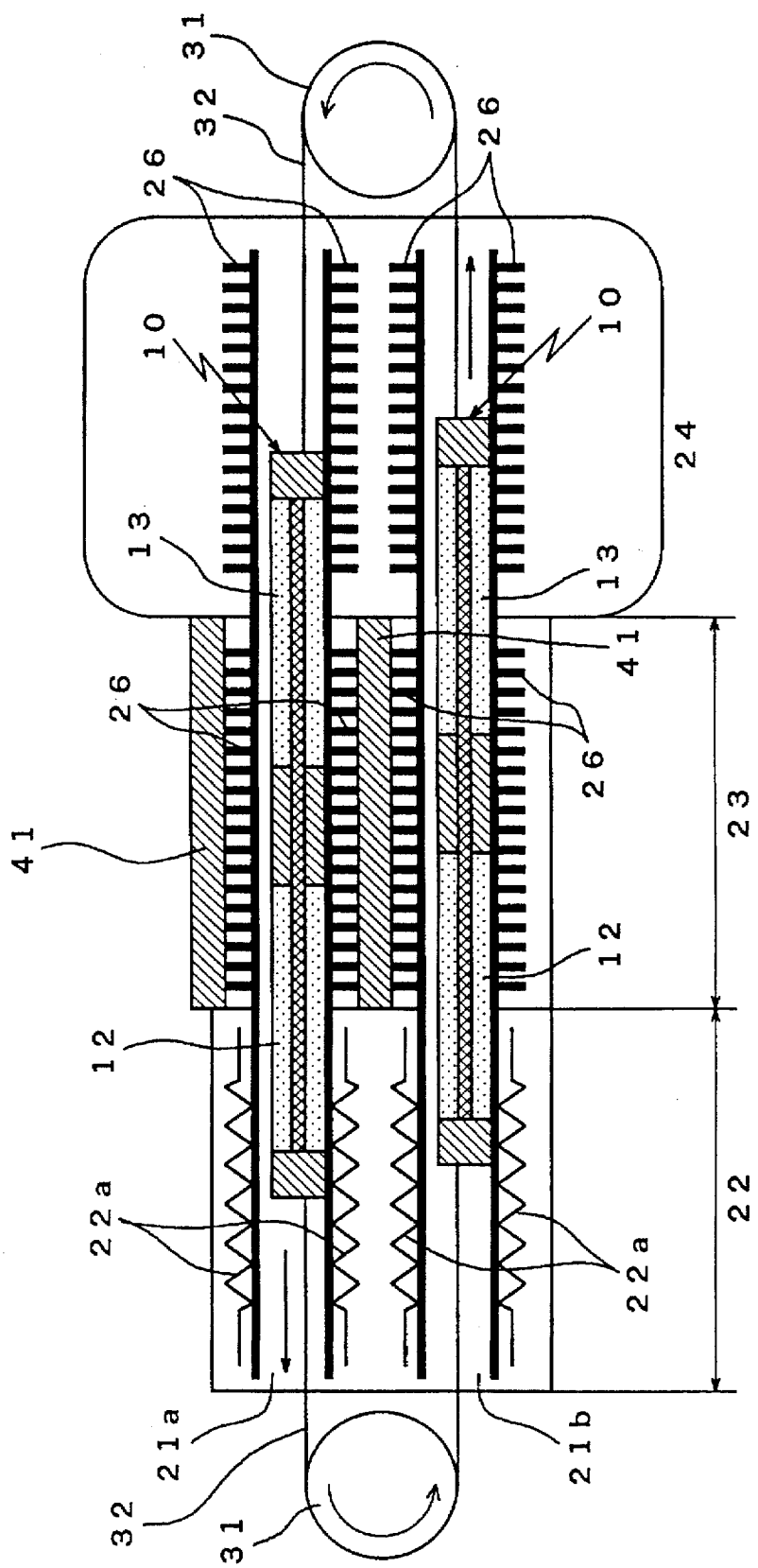
FIG. 9 is a schematic illustration showing a state where a space is provided between each of guiding sections provided separably in the longitudinal direction and each of filling containers to move the filling container in the guiding section in the heat exchanger shown in FIG. 8.
Figure 10A:
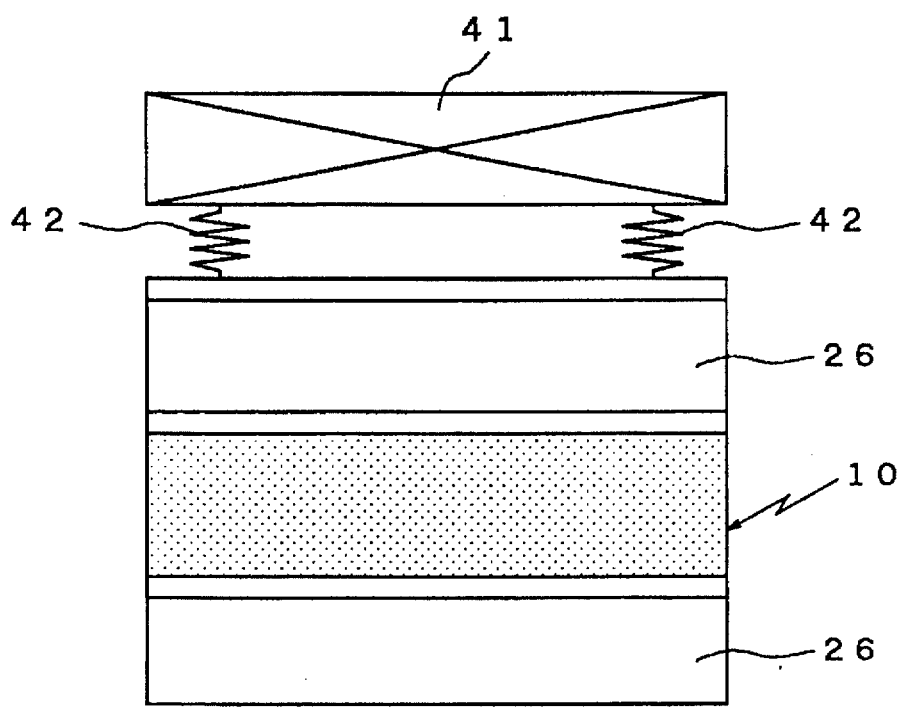
FIGS. 10 (A) and 10 (B) are respectively schematic illustrations showing a state where guiding sections provided separably in the longitudinal direction is brought into close contact with a filling container and a state where a space is provided between a guiding section and a filling container in the heat exchanger shown in FIG. 8.
Figure 10B:
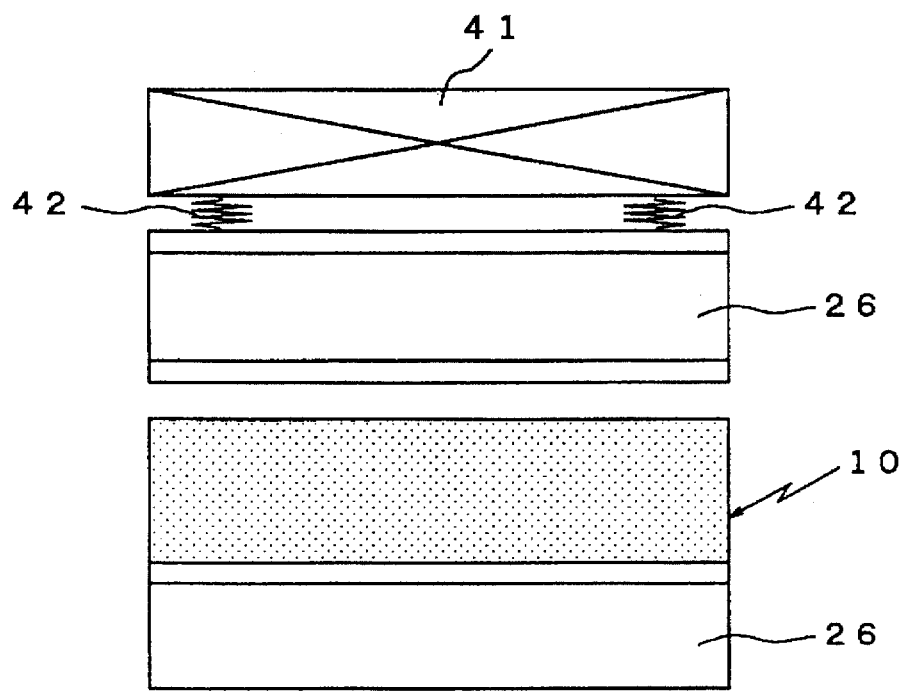

In bringing each of the filling containers 10 into close contact with each of the guiding sections 21a and 21b at the time of stopping the filling container 10, while providing a space between each of the filling containers 10 and each of the guiding sections 21a and 21b at the time of moving the filling container 10, each of the guiding sections 21a and 21b is provided so as to be separable in the longitudinal direction, and an electromagnet 41 is disposed above the heat radiating section 23 where the heat exchange fins 26 are provided in each of the guiding sections 21a and 21b, and a spring 42 is disposed between the electromagnet 41 and the heat exchange fins 26, as shown in FIGS. 8 to 10 (A) and 10 (B).

In a state where each of the filling containers 10 is stopped in each of the guiding sections 21a and 21b, the heat exchange fins 26 are pressed against the filling container 10 by the spring 42 without operating the electromagnet 41, to bring each of the filling containers 10 into close contact with each of the guiding sections 21a and 21b, as shown in FIG. 8 and FIGS. 10 (A) and 10 (B). On the other hand, in a case where each of the filling containers 10 is moved in each of the guiding sections 21a and 21b, the heat exchange fins 26 are attracted by the electromagnet 41 against the spring 42 by operating the electromagnet 41, to provide a space between each of the filling containers 10 and each of the guiding sections 21a and 21b, as shown in FIGS. 9 and 10

(B). Consequently, each of the filling containers 10 is smoothly moved, whereby power for moving the filling container 10 may be small, and the running cost is reduced.

(Embodiment 2)

A heat exchanger according to the present embodiment is approximately the same as the above-mentioned heat exchanger according to the embodiment 1 and hence, the description of the same sections as those in the heat exchanger according to the embodiment 1 is omitted. Different sections from those in the heat exchanger according to the embodiment 1 will be specifically described.

Figure 11:
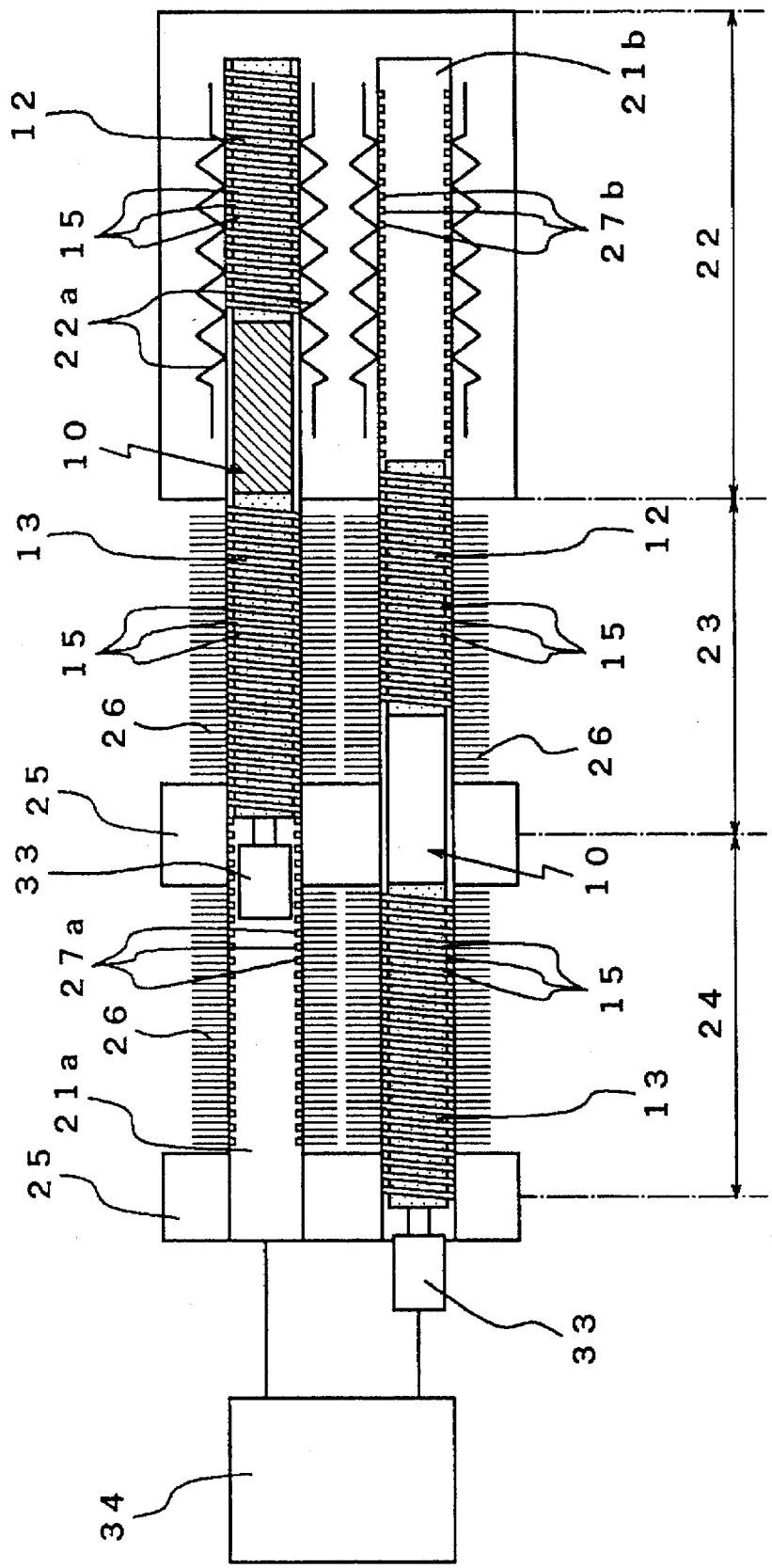
FIG. 11 is a schematic illustration showing a heat exchanger according to an embodiment 2 of the present invention.

In the heat exchanger according to the present embodiment 2, spiral-shaped screws 15 are respectively provided on the outer peripheries of a first containing section 12 and a second containing section 13 in each of filling containers 10, and grooves 27a and 27b are respectively provided on the inner peripheries of guiding sections 21a and 21b so as to correspond to the screws 15, as shown in FIG. 11.

The screws 15 formed on the outer peripheries of the filing containers 10 are respectively mated with the grooves 27a and 27b on the inner peripheries of the guiding sections 21a and 21b, so that each of the filling containers 10 is contained in each of the guiding sections 21a and 21b by shifting the position thereof, as in the above-mentioned embodiment 1.

In respectively moving the filling containers 10 contained in the guiding sections 21a and 21b back and forth along the guiding sections 21a and 21b in the heat exchanger according to the present embodiment 2, a rotating device 33 such as a pulse motor is mounted on each of the filling containers 10, and the rotating device 33 is controlled by a controller 34. The filling containers 10 are respectively moved back and forth along the guiding sections 21a and 21b while being rotated by the rotating devices 33, to exchange heat in the same manner as that in the above-mentioned heat exchanger according to the embodiment 1.

In the present embodiment 2, each of the filling containers 10 is moved while being rotated as described above, whereby each of hydrogen-absorbing metal materials M1 and M2 contained in containing sections 12 and 13 in the filling container 10 is agitated more times than that in the above-mentioned embodiment 1. Therefore, absorption and discharge of hydrogen in each of the hydrogen-absorbing metal materials M1 and M2 are further smoothed, whereby generation and absorption of heat therein are efficiently performed. Further, even when each of the hydrogen-absorbing metal materials M1 and M2 is finely powdered by absorption and discharge of hydrogen, the hydrogen-absorbing metal material finely powered is not accumulated at the bottom of the filling container 10. Even if each of the hydrogen-absorbing metal materials M1 and M2 expands by absorbing hydrogen, the bottom of the filling container 10 is not deformed. As a result, heat is exchanged stably and efficiently for a long time period.

In a case where each of the filling containers 10 is moved while being rotated and is stopped as described above, when the rotation of the rotating device 33 is controlled by the controller 34, to suitably change a state where the filling container 10 is stopped and suitably change the position of the bottom of the filling container 10, the deformation of the filling container 10 is further restrained.

Furthermore, in the heat exchanger according to the present embodiment 2, the screws 15 on the outer peripheries of the filling containers 10 are respectively mated with the grooves 27a and 27b on the inner peripheries of the guiding sections 21a and 21b. Therefore, in each of the guiding sections 21a and 21b, the areas of portions where each of the containing sections 12 and 13 in the filling container 10 is brought into contact with the heating section 22, the heat radiating section 23 and the heat absorbing section 24 are increased, whereby heat is exchanged more efficiently.

Although in the heat exchanger according to the present embodiment 2, the screws 15 provided on the outer peripheries of the filling containers 10 are respectively mated with the grooves 27a and 27b provided on the inner peripheries of the guiding sections 21a and 21b, and the filling containers 10 are respectively moved in the guiding sections 21a and 21b while being rotated by the rotating devices 33, there can be separately provided means for rotating each of the filling containers 10 in each of the guiding sections 21a and 21b and means for moving each of the filling containers 10 in each of the guiding sections 21a and 21b.

(Embodiment 3)

A heat exchanger according to the present embodiment is approximately the same as the above-mentioned heat exchanger according to the embodiment 1 and hence, the description of the same sections as those in the heat exchanger according to the embodiment 1 is omitted. Different sections from those in the heat exchanger according to the embodiment 1 will be specifically described.

Figure 12:
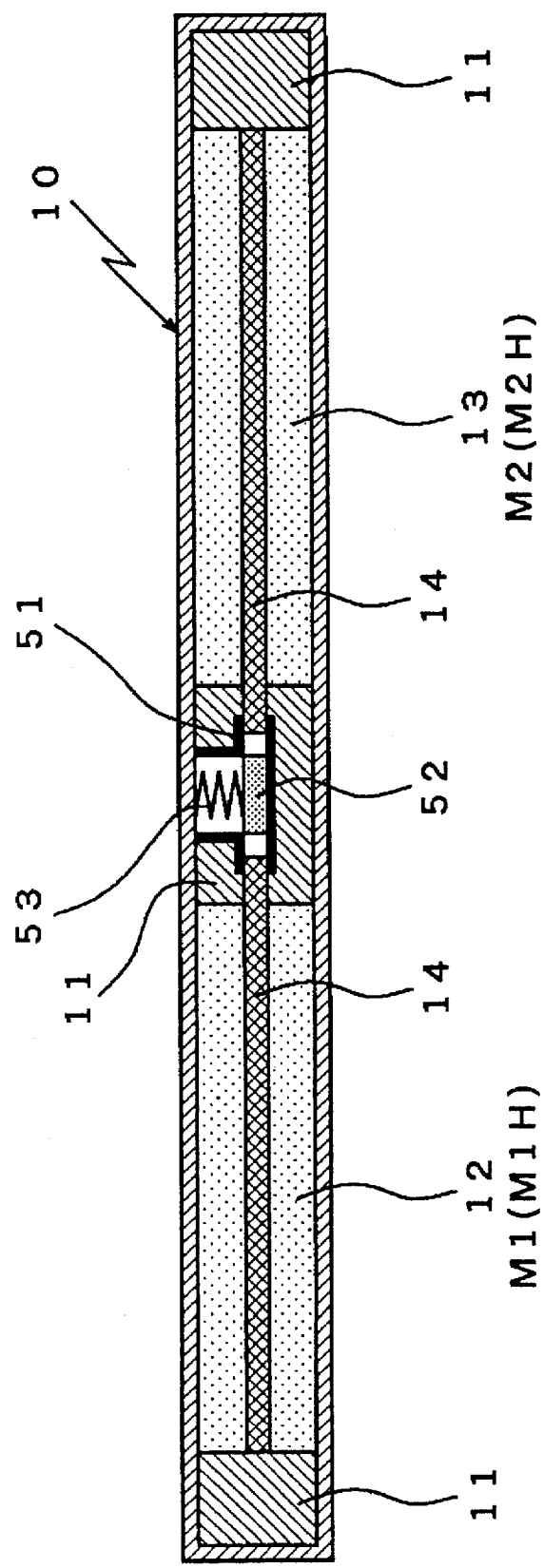
FIG. 12 is a schematic cross-sectional view of a filling container used in a heat exchanger according to an embodiment 3 of the present invention.
Figure 13:
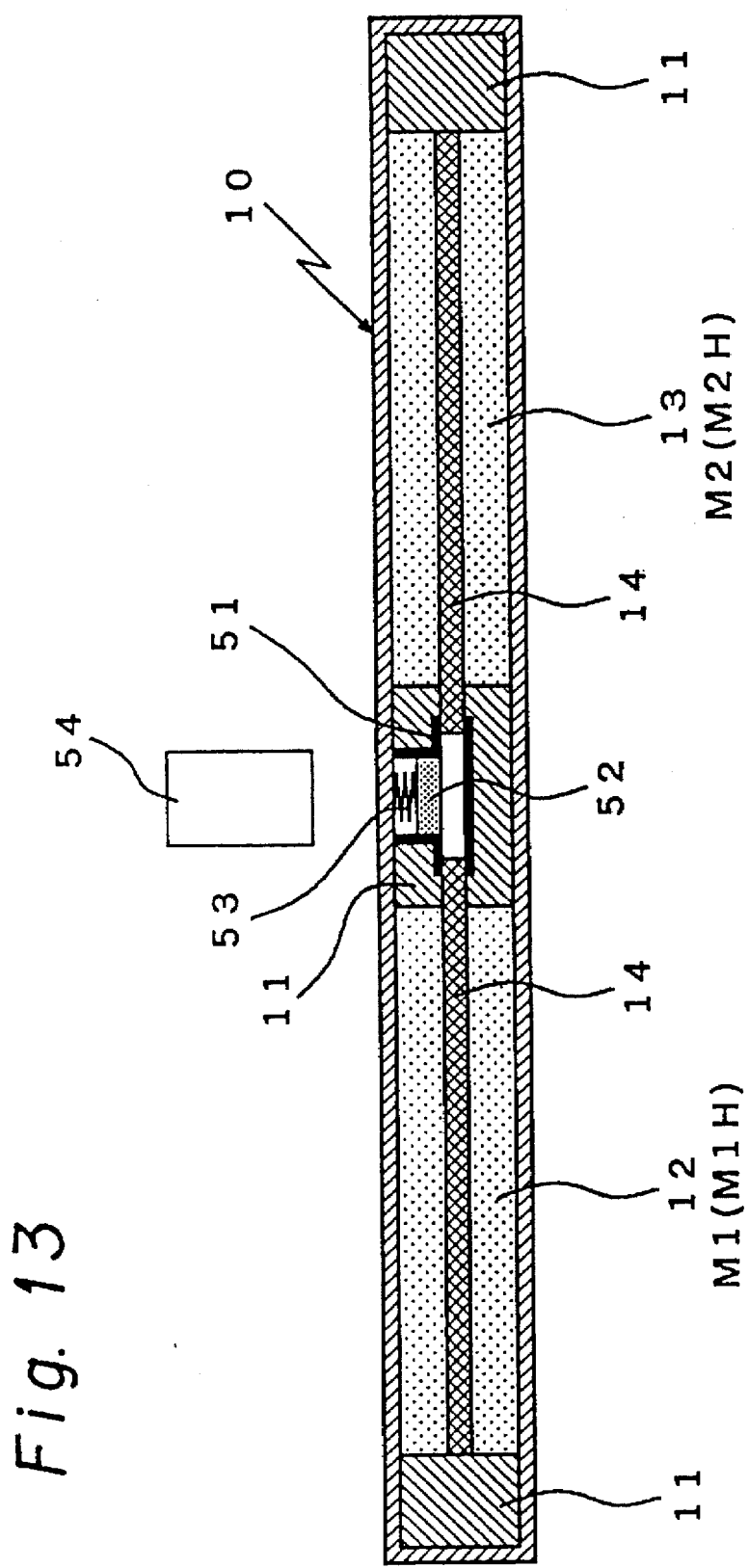
FIG. 13 is a schematic cross-sectional view showing a state where a shutter is moved by a magnet to open a connecting tube in the filling container shown in FIG. 12.

Also in the present embodiment, a filling container made of a metal and in a long narrow hollow shape is used as a filling container 10, as shown in FIG. 12. Heat insulation materials 11 are respectively provided at both ends and the center along the length of the filing container 10. The inside of the filling container 10 is divided into a first containing section 12 and a second containing section 13 by the heat insulation material 11 at the center. A hydrogen-absorbing metal material for middle or high temperature M1 and a hydrogen-absorbing metal material for low temperature M2 are respectively contained in the first containing section 12 and the second containing section 13.

In the present embodiment 3, in providing a hydrogen passage 14 for moving hydrogen between the first containing section 12 and the second containing section 13 in the above-mentioned filling container 10, air-permeable filter tubes through which hydrogen passes but the powder of a hydrogen-absorbing metal material does not pass are connected to each other by a connecting tube 51 in a portion of the heat insulation material 11 at the center so that the first containing section 12 and the second containing section 13 communicate with each other, as shown in FIG. 12. A shutter 52 composed of a magnetic material such as iron for blocking the movement of hydrogen is provided movably up and down in a portion of the connecting tube 51, and the shutter 52 is urged by a spring 53 to the position where the movement of hydrogen is blocked.

Figure 14:
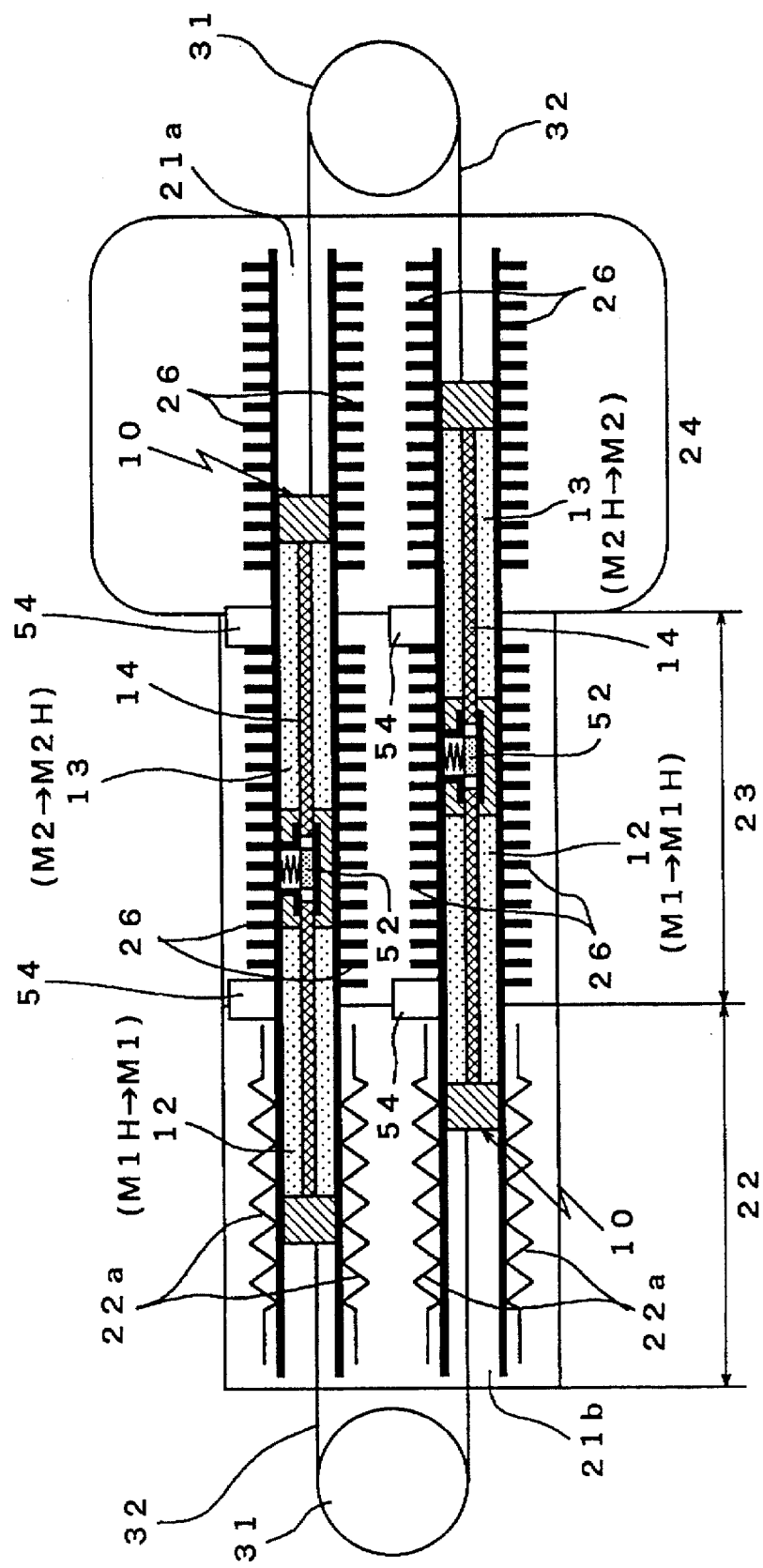
FIG. 14 is a schematic illustration showing a state where each of filling containers is moved in each of guiding sections in the heat exchanger according to the embodiment 3.
Figure 15:
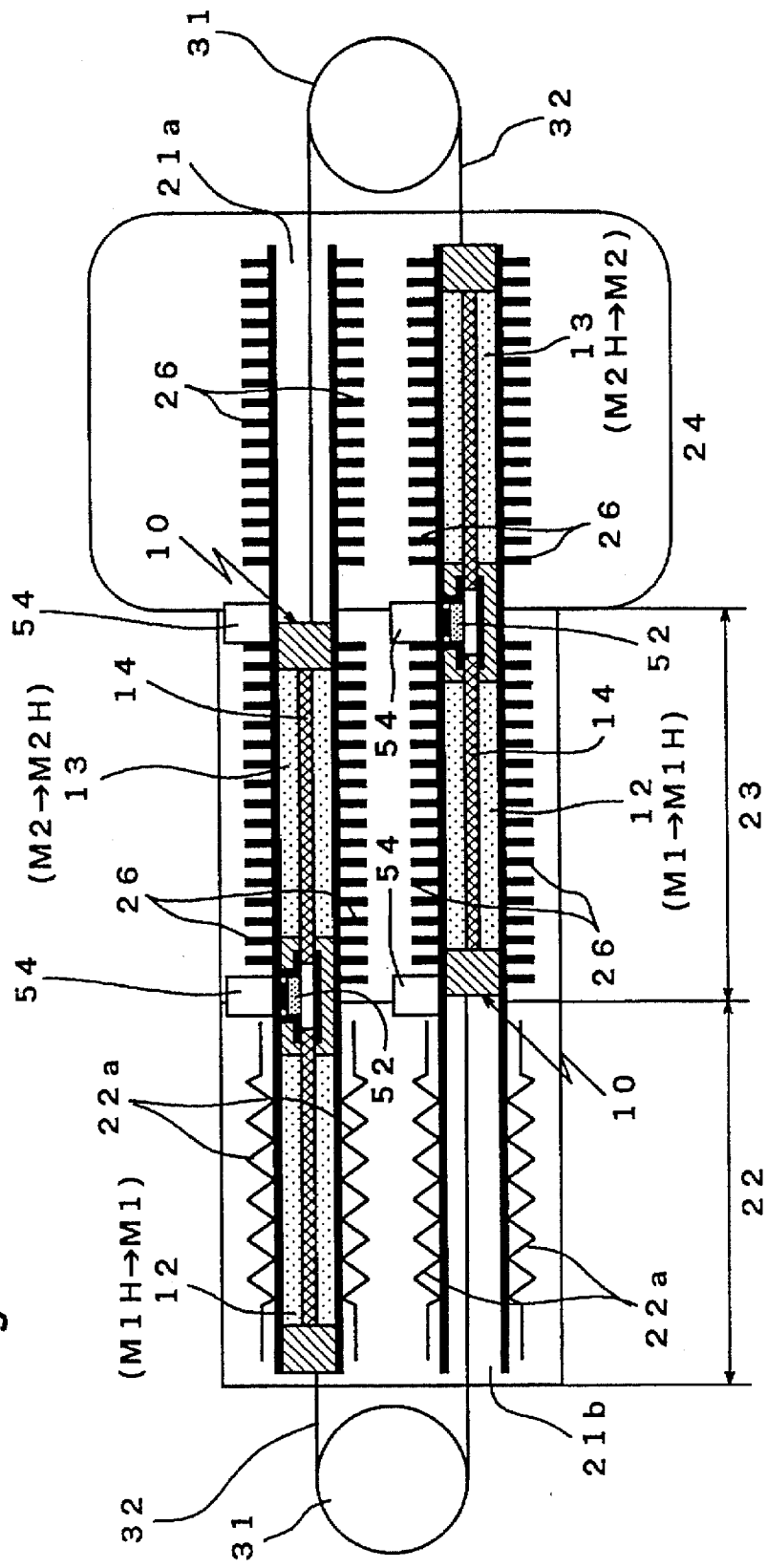
FIG. 15 is a schematic illustration showing a state where each of filling containers is introduced into a predetermined position of each of guiding sections to exchange heat in the heat exchanger according to the embodiment 3.

On the other hand, in each of guiding sections 21a and 21b for moving the above-mentioned filling container 10, magnets 54 are respectively provided in the boundary between a heating section 22 and a heat radiating section 23 and the boundary between the heat radiating section 23 and a heat absorbing section 24 on each of the guiding sections 21a and 21b, as shown in FIGS. 14 and 15. When the above-mentioned shutter 52 provided in the filling container 10 is introduced into the boundary in which the magnet 54 is provided, the shutter 52 composed of a magnetic material is attracted by the magnet 54 against the spring 53. Therefore, the connecting tube 51 blocked by the shutter 52 is opened so that hydrogen is moved between the first containing section 12 and the second containing section 13.

Also in the heat exchanger according to the present embodiment 3, the above-mentioned filling container 10 is contained in each of the guiding sections 21a and 21b by shifting the position thereof, and the filing container 10 is moved back and forth along each of the guiding sections 21a and 21b, to exchange heat in the same manner as that in the case of the above-mentioned heat exchanger according to the embodiment 1.

In the case of the heat exchanger according to the present embodiment 3, when each of the filling containers 10 is moved along each of the guiding sections 21a and 21b, the shutter 52 provided in the filling container 10 is separated from the magnet 54 provided in each of the guiding sections 21a and 21b, and the shutter 52 is pressed by the spring 53 to enter a state where the connecting tube 51 is closed, whereby the movement of hydrogen between the first containing section 12 and the second containing section 13 is blocked, as shown in FIG. 14. Therefore, there is no possibility that hydrogen is moved between the first containing section 12 and the second containing section 13 in each of the filing containers 10 to perform absorption and radiation of heat before the first containing section 12 and the second containing section 13 are introduced into the heat radiating section 23 and the heat absorbing section 24 in each of the guiding sections 21a and 21b.

On the other hand, at the time point where each of the filling containers 10 reaches a predetermined position of each of the guiding sections 21a and 21b to stop, so that the shutter 52 provided in the filling container 10 is introduced into the position of the magnet 54 provided in each of the guiding sections 21a and 21b, the shutter 52 is attracted by the magnet 54, as shown in FIG. 15. Therefore, the connecting tube 51 blocked by the shutter 52 is opened so that hydrogen is moved between the first containing section 12 and the second containing section 13, to respectively radiate and absorb heat in the heat radiating section 23 and the heat absorbing section 24.

In the heat exchanger according to the present embodiment 3, such waste that hydrogen is moved between the first containing section 12 and the second containing section 13 in each of the filling containers 10 to absorb and discharge heat before the first containing section 12 and the second containing section 13 are respectively introduced into the heat radiating section 23 and the heat absorbing section 24 in each of the guiding sections 21a and 21b is eliminated, thereby further improving heat exchanger effectiveness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A heat exchanger comprising:

a filling container having a first containing section containing a hydrogen-absorbing metal material for middle to high temperature, a second containing section containing a hydrogen-absorbing metal material for low temperature which is higher in equilibrium hydrogen pressure a a given temperature than said hydrogen-absorbing metal material for middle or high temperature, and a hydrogen passage for moving hydrogen between said first containing section and said second containing section;

a guiding section having a heating section provided with heating means for heating said filling container, a heat radiating section provided with a heat exchanging fin for radiating heat generated in said filling container outwardly, and a heat absorbing section provided with a heat exchanging fin for cooling outside ambient air by absorption of heat in said filling container; and moving means for moving said filling container back and forth in said guiding section, moving said first containing section in said filling container back and forth between said heat radiating section and said heating section, and moving said second containing section back and forth between said heating absorbing section and said heat radiating section.

2. The heat exchanger according to claim 1, wherein a cylindrical container is used as said filling container, and further comprising rotating means for rotating said filling container in a peripheral direction of said filling container.

3. The heat exchanger according to claim 1, further comprising separating means for bringing said filling container into close contact with said guiding section at a time of stopping said filling container from moving, while providing a space between said filling container and said guiding section at a time when said filling container is moved back and forth.

4. The heat exchanger according to claim 3, wherein said guiding section for moving said filling container is separably provided, and electromagnets are provided outside said guiding section with required spacing as said separating means, said electromagnets being operated to separate said guiding section at said time of moving said filling container back and forth in said guiding section.

5. The heat exchanger according to claim 1, wherein a heat transferring section made of a material high in thermal conductivity is formed near said heating means in said heating section.

6. The heat exchanger according to claim 1, wherein a heat accumulating section and of a material having heat accumulating properties is provided near said heating means in said heating section.

7. A heat exchanger comprising:

a filling container having a first containing section containing a hydrogen-absorbing metal material for middle or high temperature, a second containing section containing a hydrogen-absorbing metal material for low temperature which is higher in equilibrium hydrogen pressure at the same temperature than the hydrogen-absorbing metal material for middle or high temperature, and a hydrogen passage for moving hydrogen between the first containing section and the second containing section;

a guiding section having a heating section provided with heating means for heating said filling container, a heat radiating section provided with a heat exchanging section for radiating heat generated in the filling container outward, and a heat absorbing section provided with a heat exchanging section for cooling the outside by absorption of heat in the filling container;

moving means for moving said filling container back and forth in said guiding section, moving the first containing section in the filling container between the heat radiating section and the heating section, and moving the second containing section back and forth between the heat absorbing section and the heat radiating section; and opening or closing means for closing the hydrogen passage for moving hydrogen between the first containing section and the second containing section at the time of moving the filling container by said moving means, while opening said hydrogen passage at the time of stopping the filling container.

8. The heat exchanger according to claim 7, wherein magnetic force producing means are respectively provided in the boundary between the heat radiating section and the heating section in the guiding section and the boundary between the heat absorbing section and the heat radiating section in the guiding section as said opening or closing means, and an opening or closing member for opening the hydrogen passage between the first containing section and the second containing section by a magnetic force produced by the magnetic force producing means is provided in the filling container.

9. The heat exchanger according to claim 7, wherein a cylindrical container is used as said filling container, further comprising rotating means for rotating the filling container in its peripheral direction.

10. The heat exchanger according to claim 7, wherein separating means for bringing the filling container into close contact with the guiding section at the time of stopping the filling container, while providing a space between the filing container and the guiding section at the time of moving the filling container.

11. The heat exchanger according to claim 10, wherein said guiding section for moving the filling container is separably provided, and electromagnets are provided outside the guiding section with required spacing as said separating means, the electromagnets being operated at the time of moving the filling container to separate the guiding section, to provide a space between the filling container and the guiding section.

12. The heat exchanger according to claim 7, wherein a heat transferring section made of a material high in thermal conductivity is formed in the vicinity of the heating means in said heating section.

13. The heat exchanger according to claim 7, wherein a heat accumulating section made of a material having heat accumulating properties is provided in the vicinity of the heating means in said heating section.

* * * * *